UNITED STATES PATENT OFFICE.

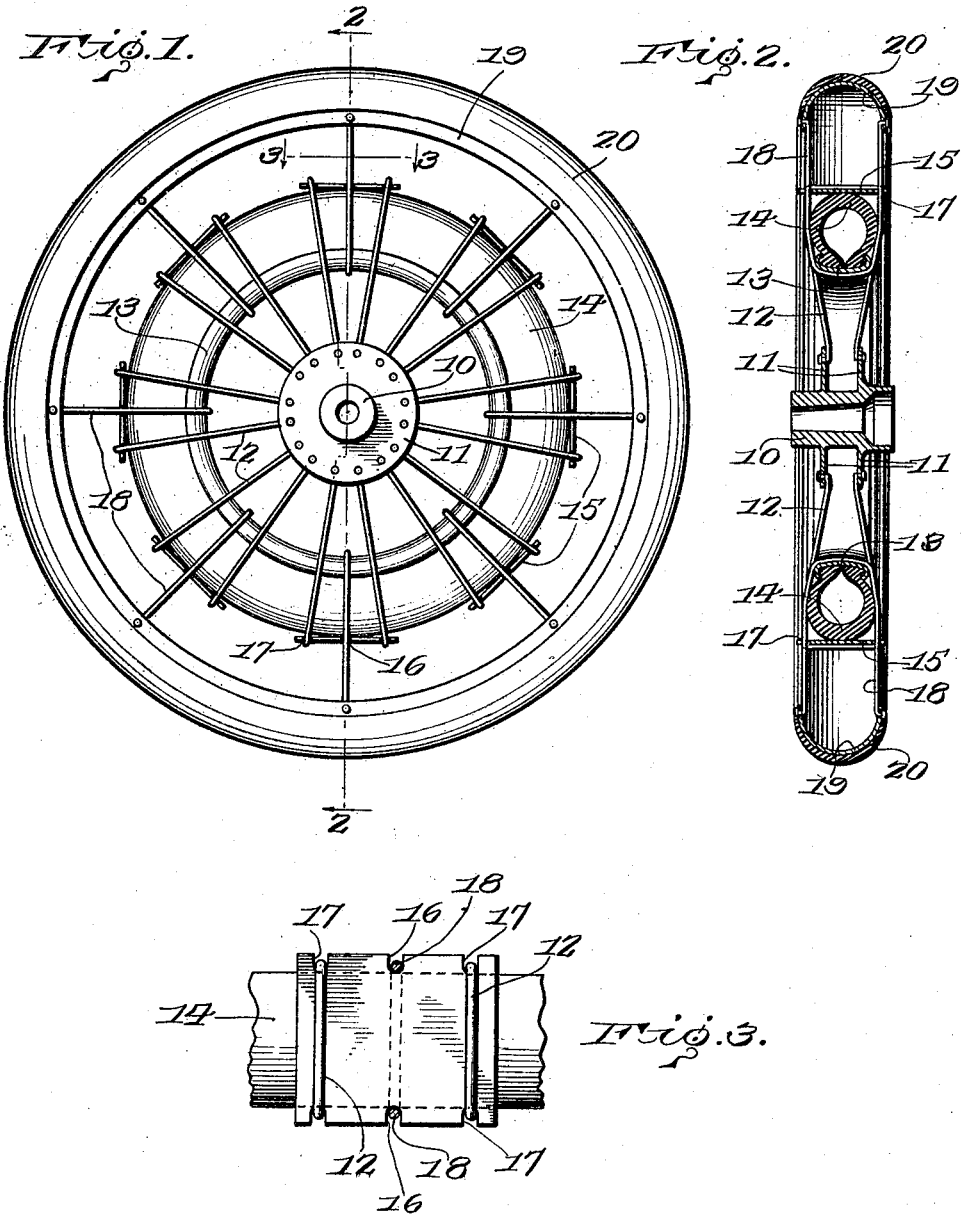

EDGAR A. BERG, OF GRAND FORKS, NORTH DAKOTA.

AUTOMOBILE WHEEL.

1,427,433.   Specification of Letters Patent.   Patented Aug. 29, 1922.

Application filed December 22, 1921. Serial No. 524,213.

*To all whom it may concern:*

Be it known that I, EDGAR A. BERG, a citizen of the United States, residing at Grand Forks, in the county of Grand Forks, State of North Dakota, have invented certain new and useful Improvements in Automobile Wheels; and I do hereby declare the following to be a full, clear, and exact description of the invention, such as will enable others skilled in the art to which it appertains to make and use the same.

This invention relates to new and useful improvements in wheels and particularly to resilient wheels.

One object of the invention is to provide a wheel of such construction that the load, applied to the hub, will be suspended from the upper portion of the wheel instead of being supported at the lower side of the wheel.

Another object is to provide a wheel of novel and improved construction having inner and outer concentric rims, the inner one of which has a pneumatic or cushion tire, and strong and durable means for connecting the inner and outer rims.

Other objects and advantages will be apparent from the following description when taken in connection with the accompanying drawing.

In the drawings:

Figure 1 is a side elevation of a wheel made in accordance with the invention.

Figure 2 is a vertical transverse central sectional view through the wheel, on the line 2—2 of Figure 1.

Figure 3 is a horizontal sectional view on the line 3—3 of Figure 1, taken between the inner and outer rims.

Referring particularly to the accompanying drawing, 10 represents a hub which has the peripheral end flanges 11 properly perforated for the reception of the ends of the arms of the yokes 12, said arms forming spokes. Disposed concentrically outward of the hub is a rim 13 of the clincher type, and properly mounted in this rim is the pneumatic tire 14. Disposed on the outer face of the tire 14 are the metal plates 15, and formed in the longer side edges of these plates are the notches 16 and 17, the former being formed intermediate the ends of the plate while the latter are disposed adjacent the ends thereof. The bight portions of the yokes 12 are disposed transversely of the plates 15, with their arms extending through the notches 17 toward the hub 10. Extending between the yokes 12, and having their bight portions embracing the rim 13, are the yokes 18, said bight portions being curved, as clearly seen in Figure 2, of the drawing.

Disposed concentrically outward of the rim 13 is a second larger rim 19, the same being concavo-convex in cross section, with its convex face disposed outwardly. A rubber tread 20 is secured to the outer face of the rim as shown in the drawing. The outer ends of the arms of the yokes 18 are secured to the outer rim 19.

Thus when a load is exerted downwardly on the hub, a downward pull will be brought to bear on the upper yokes 12 and the yokes 18, with the result that the upper portion of the tire 14 will be slightly compressed, and great resiliency imparted to the wheel.

It will also be noted that the wheel includes the advantages of the pneumatic tire resiliency, without the usual wear incident to engagement of the tire with the ground, as is experienced with the ordinary tire carried on the outer rim of the wheel.

This wheel is adapted for general use on automobiles of different makes, but is especially adapted for use in connection with Ford automobiles.

What is claimed is:

A wheel including a hub and a pair of rims of different diameters disposed concentrically outward of the hub, a pneumatic tire carried on the inner rim, a circular series of peripherally notched plates disposed on the outer tread face of the tire, a series of radial yokes having their bight portions embracing the tire and plates and with their arms engaged in certain of the said notches, and a series of yokes having their bight portions embracing the tire and inner rim, the arms of the first yokes being secured to the hub, the arms of the second yokes being secured to the outer rim.

In testimony whereof, I affix my signature, in the presence of two witnesses:

EDGAR A. BERG.

Witnesses:
C. G. BARNARD,
H. W. ROSS.